United States Patent [19]

Gupta

[11] Patent Number: 5,143,947
[45] Date of Patent: * Sep. 1, 1992

[54] RADIATION CURABLE COMPOSITION BASED ON 4-HYDROXYSTYRENE COPOLYMERS

[75] Inventor: Balaram Gupta, North Plainfield, N.J.

[73] Assignee: Hoechst Celanese Corp., Somerville, N.J.

[*] Notice: The portion of the term of this patent subsequent to May 2, 2006 has been disclaimed.

[21] Appl. No.: 435,891

[22] Filed: Nov. 13, 1989

[51] Int. Cl.$^5$ .................. C08F 2/50; C08F 257/00; C08F 12/24; C08F 22/28
[52] U.S. Cl. .................................. 522/121; 522/116; 522/120; 522/14; 525/305; 525/306; 525/307; 525/312
[58] Field of Search ............... 522/117, 116, 120, 121

[56] References Cited

U.S. PATENT DOCUMENTS

| | | | |
|---|---|---|---|
| 4,421,841 | 12/1983 | Shimizu | 522/121 |
| 4,775,730 | 10/1988 | Gupta | 522/121 |
| 4,826,890 | 5/1989 | Gupta | 522/114 |
| 4,826,891 | 5/1989 | Gupta | 522/114 |
| 5,004,762 | 4/1991 | Gupta | 522/121 |

Primary Examiner—Marion E. McCamish
Assistant Examiner—A. H. Koeckert
Attorney, Agent, or Firm—P. S. Kalyanaraman

[57] ABSTRACT

Radiation curable compositions useful as coatings for wood, metal, glass, fabric, paper, fiber and plastics are made from copolymers of 4-hydroxystyrene and an alkadiene or an allyl ester of an ethylenically unsaturated acid blended wit ethylenically unsaturated compounds.

13 Claims, No Drawings

RADIATION CURABLE COMPOSITION BASED ON 4-HYDROXYSTYRENE COPOLYMERS

BACKGROUND OF INVENTION

The field of art to which this invention pertain is radiation curable compositions.

Due to environmental concerns and the high cost of solvents, commercial interest in radiation curable compositions is constantly increasing. Legislation which restricts the amount of solvent and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable system are essentially 100 percent reactive systems, i.e., substantially all of the component react to produce the final product. Such systems can be cured by exposure to high energy ionizing radiation or to actinic radiation in the presence of photoinitiators.

Various types of ethylenically unsaturated compounds have been used in making radiation curable compositions. Examples of such compounds include acrylated epoxides, such as those described in U.S. Pat. Nos. 3,676,398, 3,770,602, 4,072,592 and 4,511,732. Acrylated urethanes, such as those described in U.S. Pat. No. 3,700,643 and U.S. Pat. No. 4,511,732, have also been used in radiation curable composition. Norbornene polymers, such as those described in U.S. Pat. No. 3,554,886, are examples of other types of radiation curable compositions. Radiation curable coating compositions made from copolymers of 4-acetoxystyrene are described in U.S. Pat. Nos. 4,826,890 and 4,826,891. Constant efforts are being made to find other compositions which can be used in radiation curing.

SUMMARY OF INVENTION

This invention pertains to radiation curable compositions based on copolymers of 4-hydroxystyrene.

The radiation curable composition of this invention are made from a blend of: (A) about 30 to about 80 weight percent of a copolymer of 4-hydroxystyrene and an alkadiene monomer or an allyl ester of an ethylenically unsaturated acid; (B) about 20 to about 70 weight percent of a polyethylenically unsaturated radiation polymerizable compound; and (C) about 0 to about 40 weight percent of a monoethylenically unsaturated radiation polymerizable monomer, wherein said weight percents are based on the weight of (A), (B) and (C).

The compositions of this invention are utilized as coating compositions and can be cured by high energy electrons or by ultraviolet light if a photoinitiator is added.

DESCRIPTION OF THE INVENTION

The 4-hydroxystyrene copolymers used in this invention can be made by copolymerizing 4-acetoxystyrene with the other monomers as described in U.S. Pat. No. 4,775,730, followed by selective hydrolysis of the acetoxy groups to phenol group using the procedure set forth in U.S. Pat. No. 4,857,601 and U.S. patent application Ser. No. 99,430, filed Sep. 11, 1987, now U.S. Pat. No. 4877843.

The 4-acetoxystyrene monomer can be made by the process described in Carson et. al., *Journal of Organic Chemistry* 23, 544–549 (1958). As described in this article, phenol is acetylated to 4-hydroxyacetophenone which is then acetylated to 4-acetoxyacetophenone. This compound is then hydrogenated to 4-acetoxyphenylmethylcarbinol, which is then dehydrated to 4-acetoxystyrene.

The alkadiene monomers useful in this invention are dialkyl muconates, alkyl sorbates and hydrocarbon alkadienes. The dialkyl muconates are diester derivatives of muconic acid. Muconic acid is a diolefinically unsaturated adipic acid derivative and can be made by the microbiological oxidation of various hydrocarbons substrates as described in U.S. Pat. Nos. 4,480,034 and 4,534,059. The dialkyl muconates useful in this invention contain 1 to 4 carbon atoms in each alkyl group and can be made by the direct esterification of muconic acid with methanol, ethanol, the propanols, or the butanols. The preferred dialkyl muconates useful in this invention are dimethyl muconate and diethyl muconate.

The alkyl sorbates which are used in preparing copolymer reacted in this invention are ester derivatives of sorbic acid. Sorbic acid, or hexadienoic acid, is a diolefinically unsaturated acid which can be made by the ring opening of the beta-lactone made from crotonaldehyde and ketene. The alkyl sorbates used in this invention contain 1 to 4 carbon atoms in the alkyl group and can be made by the direct esterification of sorbic acid with methanol, ethanol, the propanols or the butanols. The preferred alkyl sorbates useful in this invention are methyl sorbate and ethyl sorbate.

The hydrocarbon alkadienes useful in this invention are those hydrocarbons or halogen containing hydrocarbons which contain 2 conjugated ethylenically unsaturated groups per molecule and which polymerize through 1,2 or 1,4 addition leaving one unsaturated group unpolymerized. Examples of such alkadienes are 1,3-butadiene, 1,3-pentadiene, 1,3-hexadiene, 2,4-hexadiene, 2,5-dimethyl-2,4-hexadiene, isoprene, chloroprene and the like.

Allyl esters of ethylenically unsaturated acids useful in this invention are mono and diallyl ester of, respectively, mono and dicarboxylic acids which contain one polymerizable ethylenically unsaturated group. Examples of such esters include allyl acrylate, allyl methacrylate, allyl ethyacrylate, diallyl maleate, diallyl fumarate, diallyl itaconate, allyl sorbate and diallyl muconate.

In preparing copolymers with the alkadiene monomers, polymerization takes place either 1,2 or 1,4 leaving an unsaturated groups which is polymerizable by radiation. The allyl ester monomers polymerize through the ethylenic unsaturation in the acid portion of the monomer leaving the allyl unsaturation intact. Polymers formed from the diene monomers and from the allyl monomers can be crosslinked by radiation.

The copolymers used in this invention are prepared by the free radical polymerization of 4-acetoxystyrene and the other monomer in solution, emulsion, or suspension using well known polymerization techniques. The copolymers will contain about 10 to about 90 mole percent 4-acetoxystyrene and about 10 to about 90 mole percent by other monomer. The preferred copolymers are those made with about 30 to about 70 mole percent 4-acetoxystyrene and about 30 to about 70 mole percent of the other monomer.

The 4-acetoxystyrene copolymers are converted to 4-hydroxystyrene copolymers by the selective hydrolysis procedures described in U.S. Pat. No. 4,857,601 and U.S. application Ser. No. 99,430, filed Sep. 11, 1987, both of which are hereby incorporated by reference.

The polyethylenically unsaturated radiation polymerizable compounds which are blended with the copolymers described hereinabove are compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic acid esters of polyols wherein the polyols have two or more hydroxyl groups per molecule. Examples of such compounds are the diacrylic or dimethacrylic acid esters of ethylene glycol, propylene glycol, butanediol, butenediol, hexanediol, polyoxyethylene glycols, polyoxypropylene glycols, polyoxybutylene glycols, di- and triacrylic or methacrylic acid esters of glycerine and hexanetriol, trimethylolpropane, trimethylolethane, di, tri and tetra acrylic acid or methacrylic acid esters of pentaerythritol, the di, tri, tetra, penta and hexa acrylic or methacrylic acid esters of dipentaerythritol and the like. Other polyacrylates or methacrylates are the acrylated and methacrylated epoxy compounds such as the acrylated or methacrylated glycidyl ethers of dihydric phenols, acrylated and methacrylated epoxidized vegetable oils, acrylated and methacrylated urethanes and acrylated and methacrylated polyesters.

Examples of polyvinyl and polyallyl compounds are divinylbenzene, divinyltoluene, diallylbenzene, diallyltoluene, diallyl terephthalate, diallylmaleate, diallylfumarate and the like.

Monoethylenically unsaturated radiation polymerizable monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules contain from 1 up to 20 alkoxy groups, hydroxyalkyl acrylates and methacrylates wherein the alkyl group contains from 1 to 6 carbon atoms, vinyl aromatic compounds, vinyl halides, vinyl pyrrolidone, vinyl pyridine, vinyl carbazole and the like.

The radiation curable compositions of this invention can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Vander Graff accelerator, resinous transformers, linear accelerators, insulating core transformers, radioactive elements, such as cobalt 60, strontium 90, and the like. As a suitable source of nonparticulate non-ionizing radiation, any source which admits radiation in the range of from $10^{-3}$ angstroms to 2000 angstroms can be used. Suitable sources included vacuum ultra violet lamps, such as xenon or krypton arcs. As a suitable source of non-ionizing radiation, any source which admits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators may be added to the compositions. Suitable photoinitiators which are well known in the art include 2,2-diethoxy-acetophenone, 2,3 or 4-bromoacetophenone, benzaldehyde, benzoin, benzophenone, 9,10-dibromoanthracene, 4,4'-dichlorobenzophenone, 2,3-pentanedione, hydroxycyclohexyl phenyl ketone and xanthone. Such photoinitiators are generally added in amounts of from about 0.1 weight percent up to 10 weight percent based on the weight of the total curable composition and, preferably, 1 to 5 weight percent.

Photoactivators can also be used in combination with the photoinitiators. Examples of photoactivators are methylamine, tributylamine, 2-aminoethylethanolamine, cyclohexylamine, diphenylamine and tribenzylamine.

The radiation curable compositions of this invention are preferably used as coating compositions. The coatings can be applied by conventional means, including spraying, curtain coating, dip padding, roll coating and brushing procedures. The coatings can be applied to any acceptable substrate such as wood, metal, glass, fabric, paper, fiber, plastics, etc.

The compositions of this invention are made by blending the copolymers of 4-hydroxystyrene and the alkadiene or allyl ester monomers with the polyethylenically unsaturated compounds. In order to adjust the viscosity for proper application, monoethylenically unsaturated monomers can be added. Additional additives which can be used in the compositions include wetting agents, fillers, defoamers, dyes and pigments, the uses of which are well known in the art.

The following examples illustrate the invention in more detail. Parts and percentages unless otherwise designated are parts and percentages by weight.

EXAMPLE 1

To a suitable reactor are added and mixed 5 parts of a copolymer of 4-hydroxystyrene and diallyl maleate in a molar ratio of 80:20, 10 parts of tetraethylene glycol diacrylate, 17 parts of ethyl acrylate and 2 parts of Darocure 1173, a photoiniator obtained from Merck and Company. Films are prepared by coating the resulting clear viscous liquid onto polyester sheets using a one mil wire wound rod. The film are cured at a line speed of 50 feet per minute with a RPC Ultraviolet Curing Unit, Model QC-1202, Radiation Polymer Company, Plainfield, Ill. with one 300 watt per linear inch mercury vapor lamp without an infrared filter. The films exhibit excellent cure.

EXAMPLE 2

A blend is made from 20 parts of a copolymer of 85 mole percent 4-hydroxystyrene and 15 mole percent diethyl muconate, 24 parts of 1,6-hexanediol diacrylate, 17 parts of tetraethylene glycol diacrylate and 5 parts of Darocur 1173. Using the same procedure described in Example 1, well cured films are obtained.

EXAMPLE 3

Blends are made from 10 parts of a copolymer of 20 mole percent diallyl maleate and 80 mole percent 4-hydroxystyrene, 13 parts of 1,6-hexanediol diacrylate, 14.5 parts of ethyl acrylate and 2 parts of Darocur 117.3.

Using the same procedure described in Example 1, well cured films are obtained.

EXAMPLE 4

Blends are made from 40 parts of a copolymer of 80 mole percent 4-hydroxystyrene and 20 mole percent 2,5-dimethyl-2,4-hexadiene, 35 parts of trimethylolpropane triacrylate, 5 parts of ethoxyethoxyacrylate, 20 parts of N-vinyl pyrrolidone and 2 parts of hydroxycyclohexyl phenyl ketone. Coatings are drawn down on filled particle board at 0.5 mil thickness and are cured using the procedure described in Example 1. Well cured coatings are obtained.

EXAMPLE 5

Blends are made from 40 parts of a copolymer of 30 mole percent of 4-hydroxystyrene and 70 mole percent of methyl sorbate, 35 parts of trimethylolpropane triacrylate, 5 parts of ethoxyethoxyacrylate, 20 parts of N-vinyl pyrrolidone and 2 parts of hydroxycyclohexyl-phenyl ketone. Coatings are drawn down on filled particle board at 0.5 mil thickness and are cured using the procedure described in Example 1. Excellently cured coatings are obtained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable composition consisting essentially of a blend of (A) about 30 to about 80 weight percent of a copolymer of 4-hydroxystyrene and another monomer which is an alkadiene or an allyl ester of an ethylenically unsaturated acid; (B) about 20 to about 70 weight percent of a polyethylenically unsaturated radiation polymerizable compound; (C) about 0 to about 40 weight percent of a monoethylenically unsaturated radiation polymerizable monomer, wherein the weight percents are based on the total weight of (A), (B) and (C); (D) an optional photoinitiator and optional photoactivator, wherein the copolymer contains about 10 to about 90 mole percent 4-hydroxystyrene and about 90 to about 10 weight percent other monomer.

2. The radiation curable composition of claim 1 wherein the copolymer contains about 30 to about 70 mole percent 4-hydroxystyrene.

3. The radiation curable composition of claim 1 wherein the other monomer in the copolymer is dialkyl muconate having 1 to 4 carbon atoms in the alkyl groups.

4. The radiation curable composition of claim 3 wherein the dialkyl muconate is dimethyl muconate.

5. The radiation curable composition of claim 1 wherein the other monomer in the copolymer is an alkyl sorbate having 1 to 4 carbon atoms in the alkyl group.

6. The radiation curable compositions of claim 5 wherein the alkyl sorbate is methyl sorbate.

7. The radiation curable composition of claim 1 wherein the other monomer in the copolymer is a hydrocarbon alkadiene.

8. The radiation curable composition of claim 7 wherein the hydrocarbon alkadiene is 2,5-dimethyl-2,4-hexadiene.

9. The radiation curable composition of claim 1 wherein the other monomer in the copolymer is a diallyl ester of a dicarboxylic acid which contains one polymerizable ethylenically unsaturated group.

10. The radiation curable composition of claim 9 wherein the other monomer in the copolymer is diallyl maleate.

11. The radiation curable composition of claim 1 wherein the polyethylenically unsaturated radiation polymerizable compound contains 2 to 6 ethylenically unsaturated groups.

12. The radiation curable composition of claim 13 wherein the photoinitiator is present in the amount of about 0.1 weight percent up to about 10 weight percent based on the total weight of the composition.

13. The radiation curable composition of claim 13 wherein the photoinitiator is present in the amount of about 1 to about 5 weight percent.

* * * * *